United States Patent [19]

Deetz et al.

[11] Patent Number: 4,710,205

[45] Date of Patent: Dec. 1, 1987

[54] STABILIZED LIQUID FILMS

[75] Inventors: David W. Deetz, Apple Valley; Maurice M. Kreevoy, Minneapolis, both of Minn.

[73] Assignee: Honeywell Inc., Minneapolis, Minn.

[21] Appl. No.: 25,920

[22] Filed: Mar. 16, 1987

[51] Int. Cl.$^4$ .............................................. B01D 53/22
[52] U.S. Cl. .......................................... 55/158; 55/16; 55/68
[58] Field of Search ............................. 55/16, 68, 158

[56]  References Cited

U.S. PATENT DOCUMENTS

| | | | |
|---|---|---|---|
| 3,396,510 | 8/1968 | Ward, III et al. | 55/16 |
| 3,447,286 | 6/1969 | Dounoucos | 55/16 |
| 3,503,186 | 3/1970 | Ward, III | 55/16 |
| 3,625,734 | 12/1971 | Ward, III | 55/16 X |
| 3,676,220 | 7/1972 | Ward, III | 55/158 X |
| 3,770,842 | 11/1973 | Steigelmann et al. | 55/16 X |
| 3,819,806 | 6/1974 | Ward, III et al. | 55/16 X |
| 3,844,735 | 10/1974 | Steigelmann et al. | 55/16 |
| 3,865,890 | 2/1975 | Steigelmann et al. | 55/16 |
| 3,951,621 | 4/1976 | Hughes et al. | 55/16 |
| 3,980,605 | 9/1976 | Steigelmann et al. | 55/16 X |
| 4,014,665 | 3/1977 | Steigelmann | 55/16 |
| 4,015,955 | 4/1977 | Steigelmann et al. | 55/16 |
| 4,040,805 | 8/1977 | Nelms et al. | 55/158 |
| 4,089,653 | 5/1978 | Ward, III | 55/158 |
| 4,115,514 | 9/1978 | Ward, III | 55/16 X |
| 4,157,960 | 6/1979 | Chang et al. | 55/158 X |
| 4,187,086 | 2/1980 | Walmet et al. | 55/16 |
| 4,235,983 | 11/1980 | Steigelmann et al. | 55/16 X |
| 4,239,506 | 12/1980 | Steigelmann et al. | 55/16 |
| 4,239,507 | 12/1980 | Benoit et al. | 55/16 |
| 4,243,701 | 1/1981 | Riley et al. | 55/158 X |
| 4,268,279 | 5/1981 | Shindo et al. | 55/16 |
| 4,340,481 | 7/1982 | Mishiro et al. | 55/158 X |
| 4,419,187 | 12/1983 | Cheng et al. | 55/158 X |
| 4,419,242 | 12/1983 | Cheng et al. | 55/16 X |
| 4,474,858 | 10/1984 | Makino et al. | 55/158 X |
| 4,583,996 | 4/1986 | Sakata et al. | 55/16 |
| 4,606,740 | 8/1986 | Kulprathipanja | 55/158 X |
| 4,614,524 | 9/1986 | Kraus | 55/158 X |
| 4,617,029 | 10/1986 | Pez et al. | 55/16 |
| 4,627,859 | 12/1986 | Zupancic et al. | 55/158 |

FOREIGN PATENT DOCUMENTS 90722  5/1986  Japan ..................................... 55/16

OTHER PUBLICATIONS

Membrance Technology and Applications: An Assessment, Office of Scientific and Technical Information, United States Department of Energy, Stephen A. Leeper et al., Feb. 1984.

Recent Developments in Separation Science, vol. 1, Norman N. Li, Sc. D., CRC Press, 1972, pp. 153–161.

Physical Chemistry of Surfaces, 4th Edition, John Wiley & Sons, pub., Arthur W. Adamson, 1982, Chapter X, 332–368.

Primary Examiner—Robert Spitzer
Attorney, Agent, or Firm—Charles G. Mersereau

[57]  ABSTRACT

Composite polymeric transport membrane structures feature an ultra-thin polymeric membrane skin having microscopic pores therein forming an anisotropic microporous film combined with a relatively thick macroporous polymeric support substrate membrane which carries the skin. A quantity of liquid transport medium in the pores of the ultra-thin membrane skin enhances transport of one or more species of interest and wets the surface of the pores. The microscopic pores are of a size such that the vapor pressure of the liquid transport medium contained therein is reduced by an amount equal to or greater than that theoretically predicted by the Kelvin effect. Methods of activating the membrane with the transport mediums are also disclosed.

22 Claims, 12 Drawing Figures $r' = r \cos \theta$

DIAGRAM OF A LIQUID IN A
UNIFORM PORE

REDUCTION OF VAPOR PRESSURE
OF VARIOUS LIQUIDS IN SMALL PORES

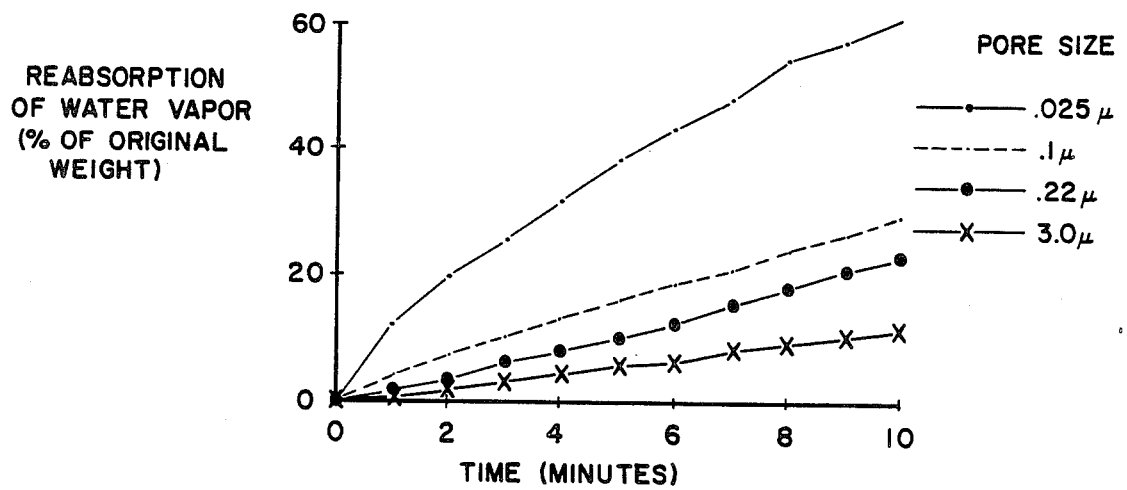
Fig. 6 REABSORPTION OF WATER FOR MEMBRANES WITH DIFFERENT PORE DIAMETERS
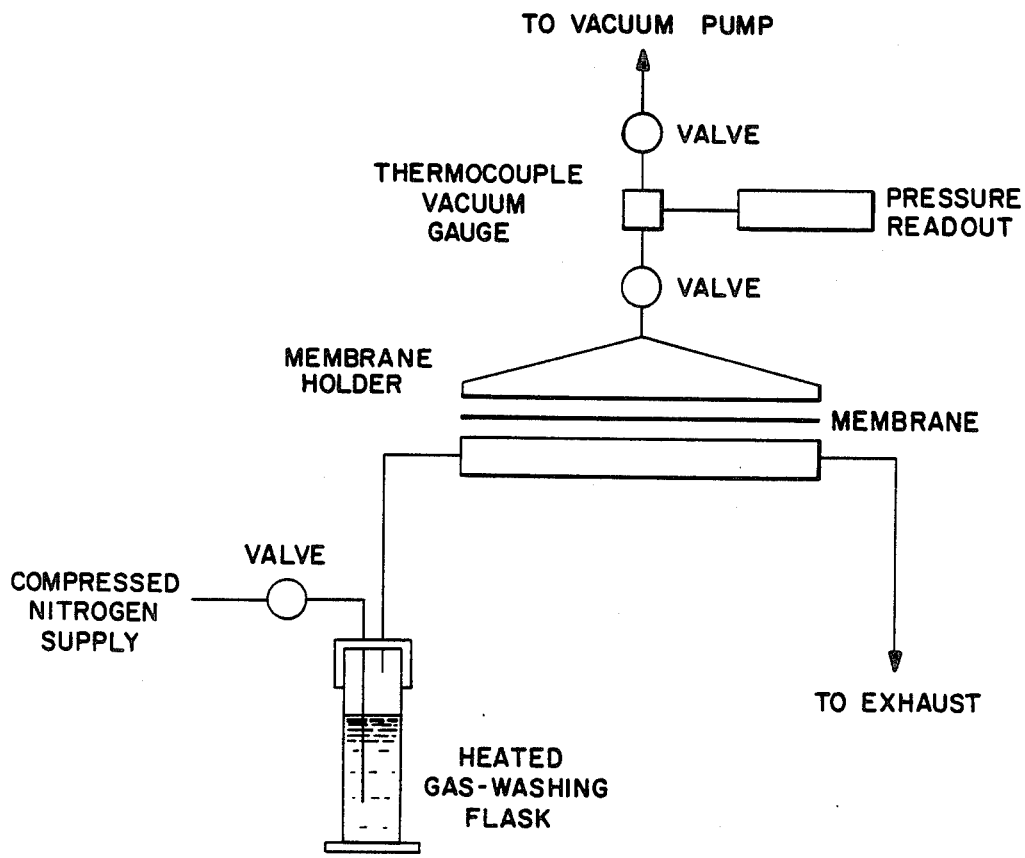
Fig. 7 APPARATUS FOR ULTRA-THIN MEMBRANE FABRICATION EXPERIMENTAL RESULTS DEMONSTRATING THE SELF REGENERATION PROPERTIES OF THE AQUEOUS/LiBr LIQUID MEMBRANE

COMPARISON OF THE OPERATING RANGE OF REPORTED WATER-BASED LIQUID MEMBRANES

STABILIZED LIQUID FILMS

BACKGROUND OF THE INVENTION

1. Field of the Invention

The present invention relates generally to stabilized liquid films and, more particularly, to stabilized liquid membranes for separations in the gaseous phase.

2. Description of the Prior Art

Membrane systems for the separation of gases are potentially attractive because they offer low capital and operating costs, along with low energy requirements. Unfortunately, the high performance selectivity required for most applications cannot be met by prior art membranes. The major obstacle to be overcome is the development of stable membranes which simultaneously have the high selectivities and fluxes required for energy efficient operation. A performance summary comparison of several prior art membrane types with membranes of the present invention appear in Table I, next below.

| | PERFORMANCE SUMMARY OF VARIOUS SELECTIVE MEMBRANES FOR GAS SEPARATIONS | | | |
|---|---|---|---|---|
| | AREA IN WHICH PERFORMANCE CRITERIA ARE SATISFACTORY FOR MOST APPLICATIONS | | | |
| | | INTERNAL RESISTANCE | | |
| MEMBRANE TYPE | SELECTIVITY | PERMEABILITY | THICKNESS | STABILITY |
| CONVENTIONAL POLYMER MEMBRANE (PRIOR ART) | | | | X |
| ANISOTROPIC POLYMER MEMBRANE (PRIOR ART) | | | X | X |
| CONVENTIONAL IMMOBILIZED LIQUID MEMBRANES (PRIOR ART) | X | X | | |
| STABILIZED LIQUID MEMBRANES | X | X | | X |
| ANISTROPIC STABILIZED LIQUID MEMBRANES | X | X | X | X |

The first three membrane types in the Table are found in the prior art. Generally, those prior art membranes which are stable lack selectivity and are not sufficiently permeable and those exhibiting selectivity and desirable permeability are not stable.

Conventional solid polymer membranes, for example, have been widely investigated for gas separations for many years. In order to maximize transport fluxes, asymmetric versions of polymer membranes with very thin (approximately one micron) membrane "skin" have been developed. Examples of these are found in Riley, et al, *J. Appl. Polymer Science,* 1967, 11, 2143 and S. Lobe, et al, *Saline Water Conversion II,* p. 117, *Advances In Chemistry Series No.* 38, American Chemical Society, 1962. While representing progress in the field, these ultra-thin polymer membranes are still short of the flux needed for many applications. Also, the selectivity of the membranes to gases has often been poor and this limits their usefulness.

Another approach to achieving high fluxes, beside making the membranes thinner, is to use materials which have high permeability. Liquids are much more permeable than solid polymers. This is because of the high gas diffusion coefficients in liquids (approximately 1,000 times greater than in solid polymers) and the high gas/vapor solubilities in liquids. Immobilized liquid membranes (ILMs), which are composed of liquids immobilized in porous polymer matrices such as those described by W. I. Ward, et al in *Science,* 1967, 156, 1481, not only have high permeabilities, but are also simultaneously highly selective unlike polymer membranes.

Although immobilized liquid membranes are much more permeable and selective than solid polymer membranes and have shown a great deal of promise, such prior art membranes have several deficiencies which have to be overcome before they can be effectively utilized. The most important is that they are not stable over long periods of time. The short life time of such membranes is primarily due to the loss of the liquid phase by evaporation. As a practical matter, then, such prior art liquid membranes can be used only if the gas stream flowing past the membrane is first treated, preferably saturated, with the liquid used in the membrane to reduce evaporative loss, or, if the membrane liquid is replaced frequently.

However, as the above illustrates, a need has existed for an ILM system of reduced vapor pressure which, at the same time, maximizes flux.

SUMMARY OF THE INVENTION

The present invention is directed to immobilized liquid membranes which achieve the simultaneously high permeability and selectivity associated with prior ILMs together with an extremely high flux in a manner which overcomes the time variable stability problems associated with prior art ILMs. This is made possible by the discovery that liquid entrapped in a microporous structure of an ILM of sufficiently small pore size results in a decrease in vapor pressure in accordance with the Kelvin effect (explained below). Even more importantly, if the pore size is decreased sufficiently beyond this point, a decrease in vapor pressure results which is far in excess of that theoretically predicted or previously thought possible, i.e., far in excess of that predicted by the Kelvin effect. While the maximum pore size in which this "super Kelvin" effect occurs will vary with material liquid transport medium and circumstance, it generally begins at an average pore size of about 0.1 micron or less and is extremely important below about 0.02 micron.

Stabilized ILMs of the invention utilize a liquid or combination solvent solute system in the pores of a microporous structure to reduce vapor pressure to the Kelvin or super Kelvin range and thereby stabilize the ILMs making them suitable for long term use even under varying external conditions. Solvent/solute combinations may be tailored to enhance the selectivity and flux of transport with respect to a species of interest.

Low or reduced vapor pressure liquids may be used alone in the microporous structure where applicable.

Many combinations of solid porous membranes with liquids can be imagined and fabricated in accordance with the invention. One preferred embodiment type involves the use of unsupported porous polymer membranes having thickness of from about 6 to 200 microns and using a solvent/solute liquid system. Water is the preferred solvent or liquid, whose vapor pressure has been reduced by entrapping it in the microporous structure of a regenerated cellulose, cellulose ester polyester or silicone, for example, and adding highly soluble salts such as $Cs_2CO_3$ or LiBr. For any such combination of solvent and solute selectivity may be enhanced by facilitated transport, i.e., by the addition of specific chemical species that are able to reversibly react with the species selected to thereby enhance transport. This includes, for example, a combination such as water and dissolved LiCl to which cellulose acetate and ethylene diamine (EDA) have been added for the selective permeation of $CO_2$. In this manner, selective permeation, which may be defined as the transport of the species of interest or desired species relative to other named species across the membrane, relative to $O_2$ or $N_2$ of over 1,000 have been achieved together with fluxes of over 500 (relative to a silicone membrane, for example).

In accordance with an alternate embodiment, the stabilized liquid films of the invention utilize a composite construction in which extremely thin (0.1–1.5 microns) dense "skin" films of extremely fine, controlled microporous pore structure are cast onto porous substrates of a much thicker (50–250 microns) open-celled spongy layer of a polymer, possibly the same polymer as the skin. The pore structure is anisotropic and consists of torturous channels having a nominal diameter normally less than 0.1 micron. Materials include polysulfone, regenerated cellulose (from cellulose acetate), acrylic copolymers, and the like. The pores of these ultra-thin, microporous films may contain a liquid which wets the material of the film and may also contain dissolved salts. Alternatively, this film may be used in a non-wetting or hydrophobic mode.

IN THE DRAWINGS

Figure 4:
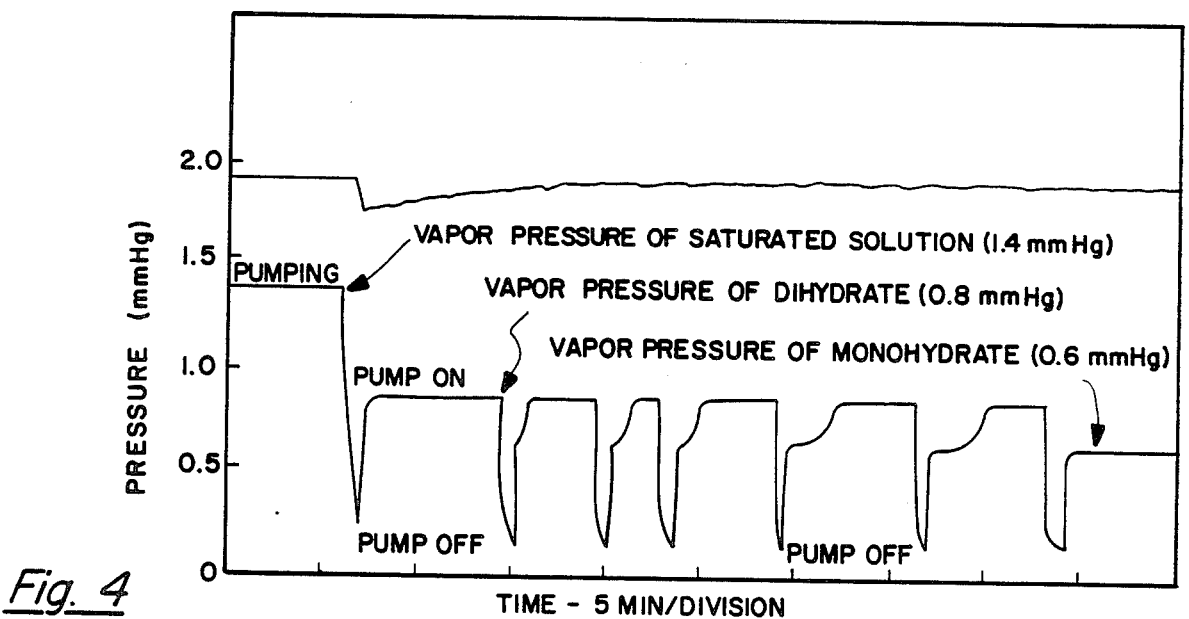
Figure 5:
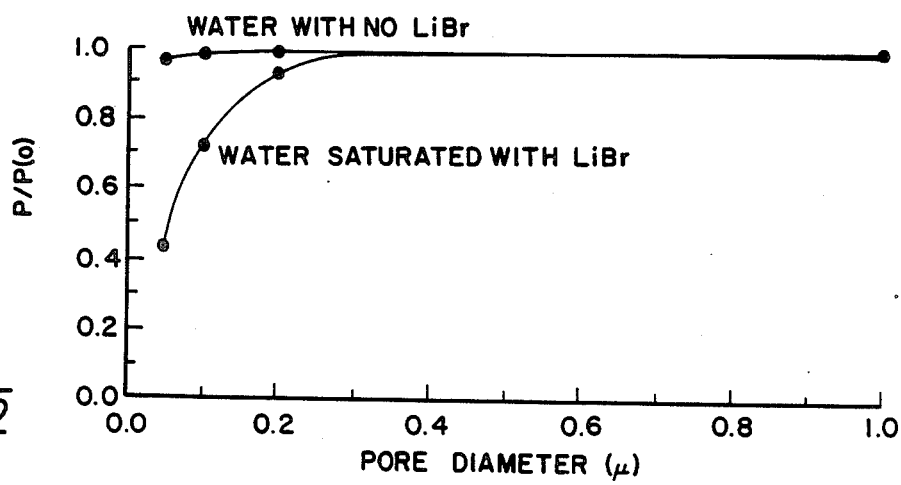
Figure 8:
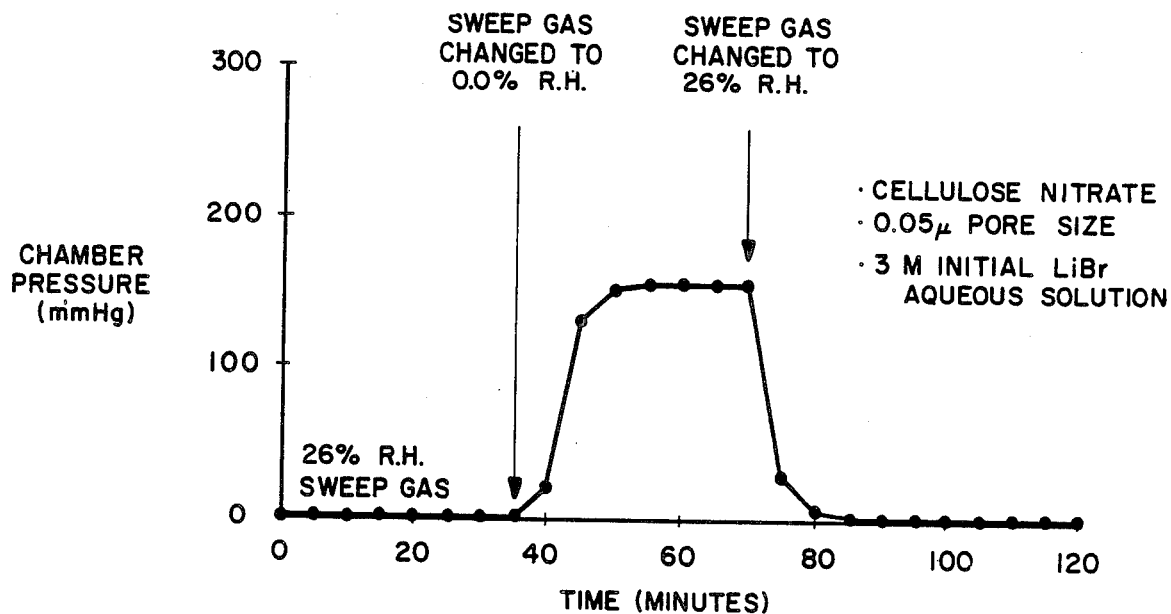
Figure 9:
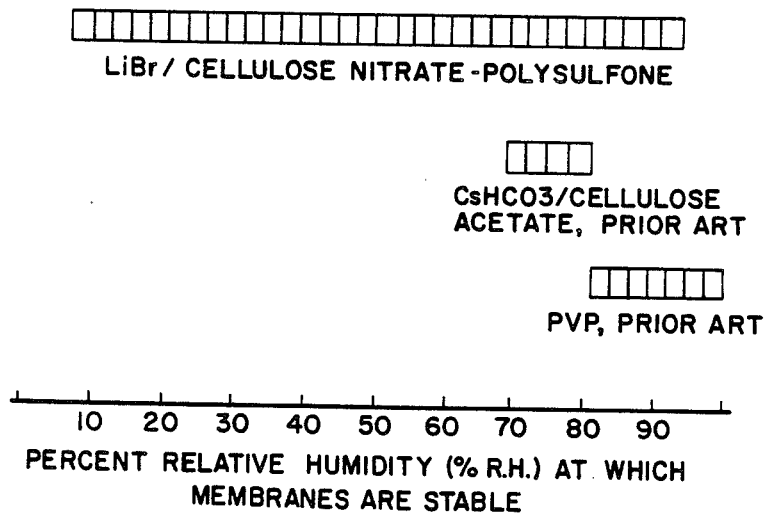
Figure 10:
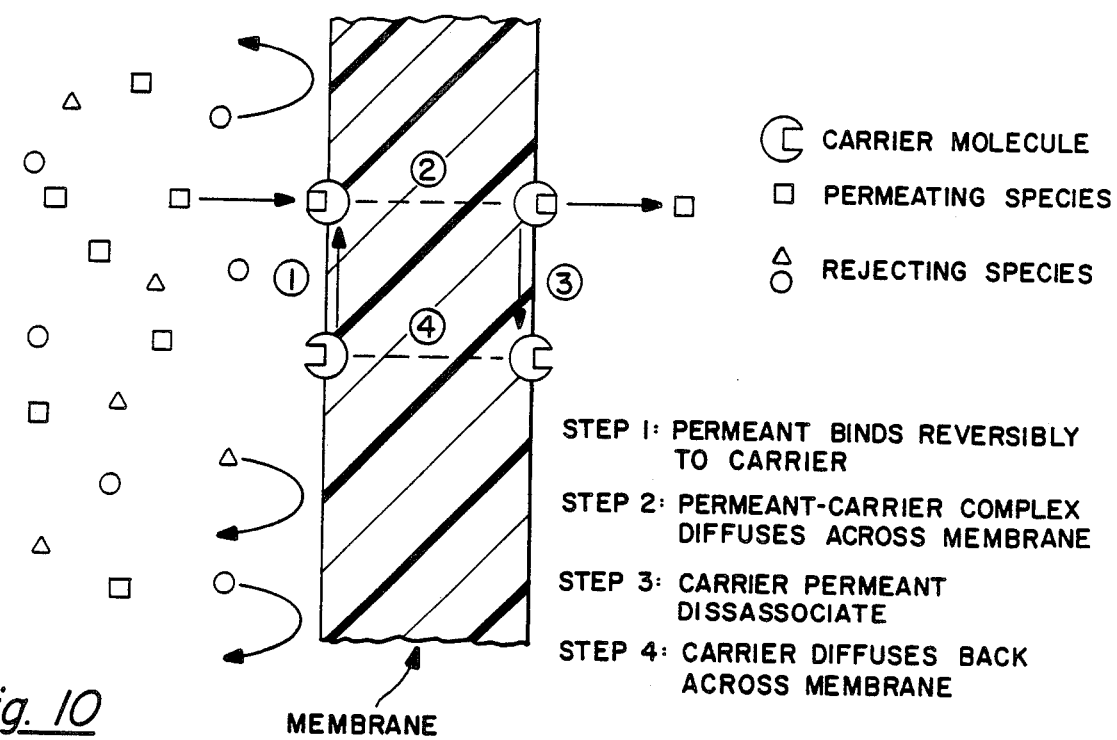
Figure 11:
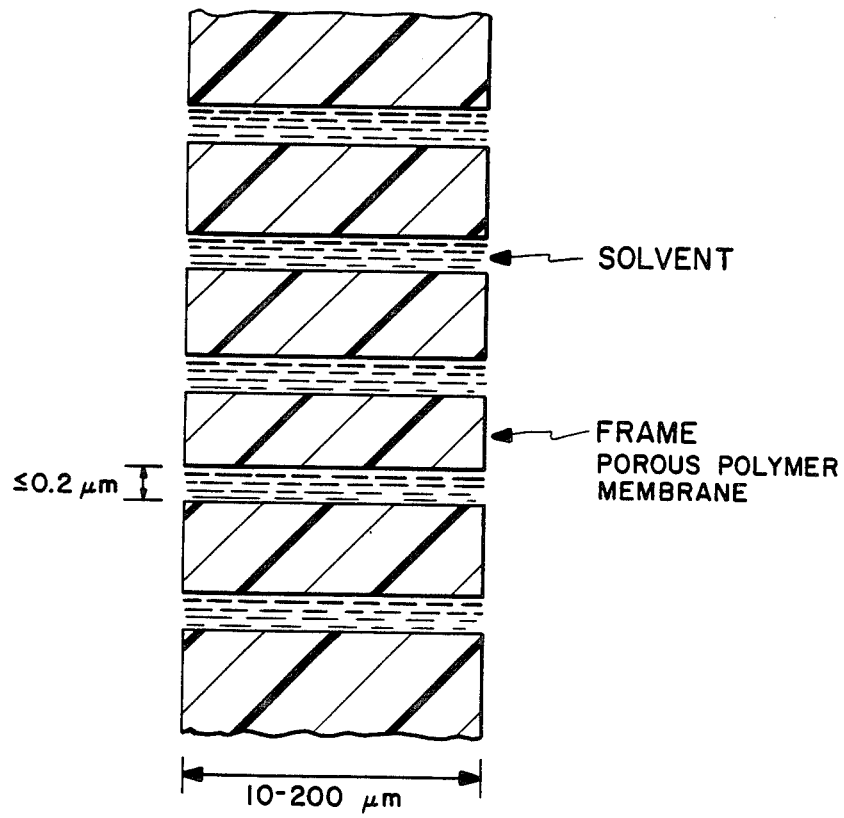
Figure 12:
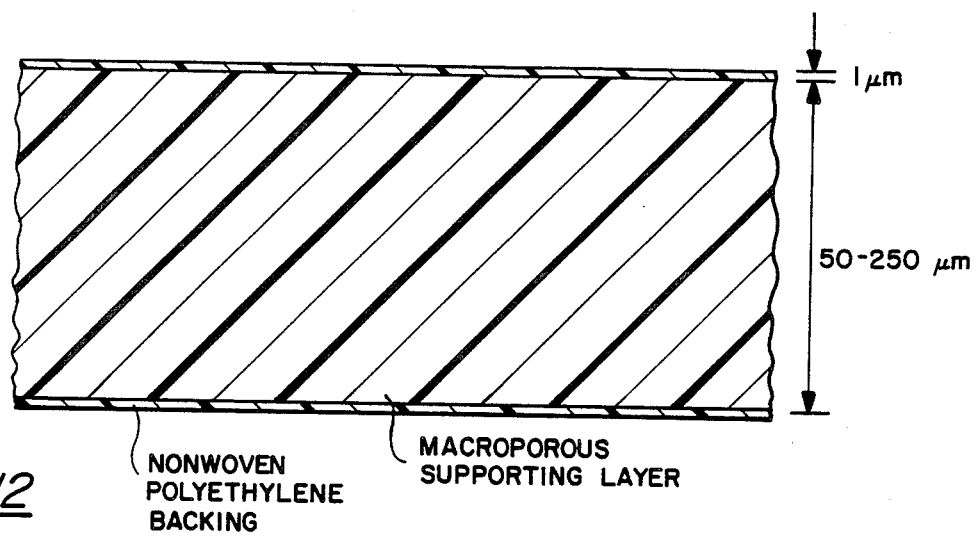

FIG. 4 characterizes vapor pressure measurements of a LiBr solution;

FIG. 5 illustrates curves of normalized vapor pressure versus pore size for both water and aqueous LiBr;

FIG. 6 illustrates the water readsorption properties of membranes with different pore sizes;

FIG. 7 is a schematic representation of an apparatus for ultra-thin membrane fabrication;

FIG. 8 is a plot representing the self-regeneration properties of an aqueous/LiBr liquid membrane;

FIG. 9 is a comparison of R. H. operating range for several water-based liquid membranes;

FIG. 10 illustrates facilitated transport;

FIG. 11 is a greatly enlarged cross-sectional view of a stabilized liquid membrane in accordance with the invention; and FIG. 12 is a greatly enlarged cross-sectional view of a composite membrane.

DESCRIPTION OF THE PREFERRED EMBODIMENT

With respect to a porous ILM, the reduction of the size of the pores in which the liquid is immobilized has been found to have a significant effect on the liquid vapor pressure, and ultimately on ILM stability. One method for reducing the vapor pressure of immobilized liquids involves the expanded use of the capillary forces responsible for immobilization. As explained in greater detail below, the general criteria with respect to the films of the present invention include the fact that it appears that within the Kelvin and super Kelvin effect pore size range, the smaller the microporous pores, the better the liquid solution retention achieved relative to that predicted by the Kelvin equation.

The immobilized liquid or the solvent/solute combination which is entrapped in the pores should be chemically inert with respect to the membrane and membrane support material as well as the environmental species, including any species of interest, and not interfere with the process for which the membrane is to be applied. The liquid or solvent, of course, must have the ability to wet the surface of the film unless the use is with a low vapor pressure hydrophobic material. Facilitated transport species may be selected, if desired, to enhance the reversible reaction with a species of interest sought to be transported across the membrane.

EXPLANATION OF THE KELVIN EFFECT

The general vapor-pressure/pore-size relationship was derived by Lord Kelvin over a century ago and is known as the Kelvin effect. Some discussion of the Kelvin effect is warranted here to aid in understanding the novel concept of applying that effect to membrane technology.

Figure 1:
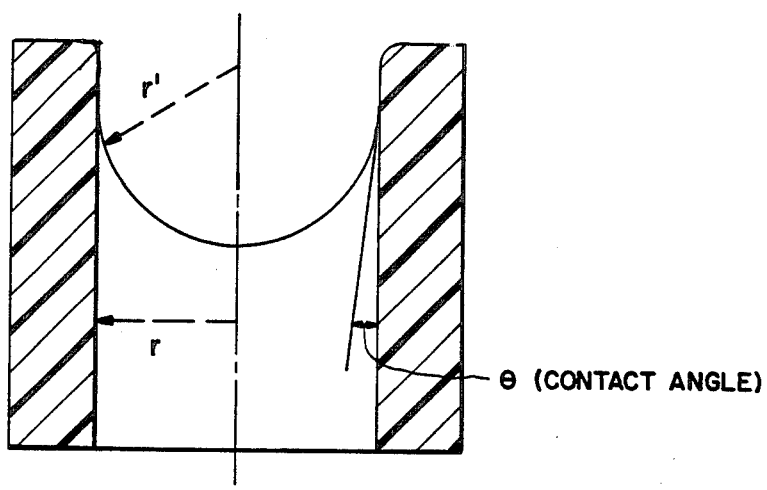
FIG. 1 is a greatly enlarged schematic diagram of a wetting liquid in a uniform pore.

The vapor pressure of a liquid can be reduced if it is confined to a series of small capillary-like pores with diameters of 0.2 microns or less. The relationship between the magnitude of the vapor pressure reduction and pore radius is given by the Kelvin equation $$P/P_o = e^{-2yM/\rho RTr'} \quad (1)$$

where $P/P_o$ is the ratio of the vapor pressure of the liquid in the pore relative to the vapor pressure of the bulk liquid, y is the surface tension, M is the molecular weight, $\rho$ is the liquid density, R is the gas constant, T is the absolute temperature and $r'$ is the effective radius of the pores as defined in FIG. 1.

Figure 2:
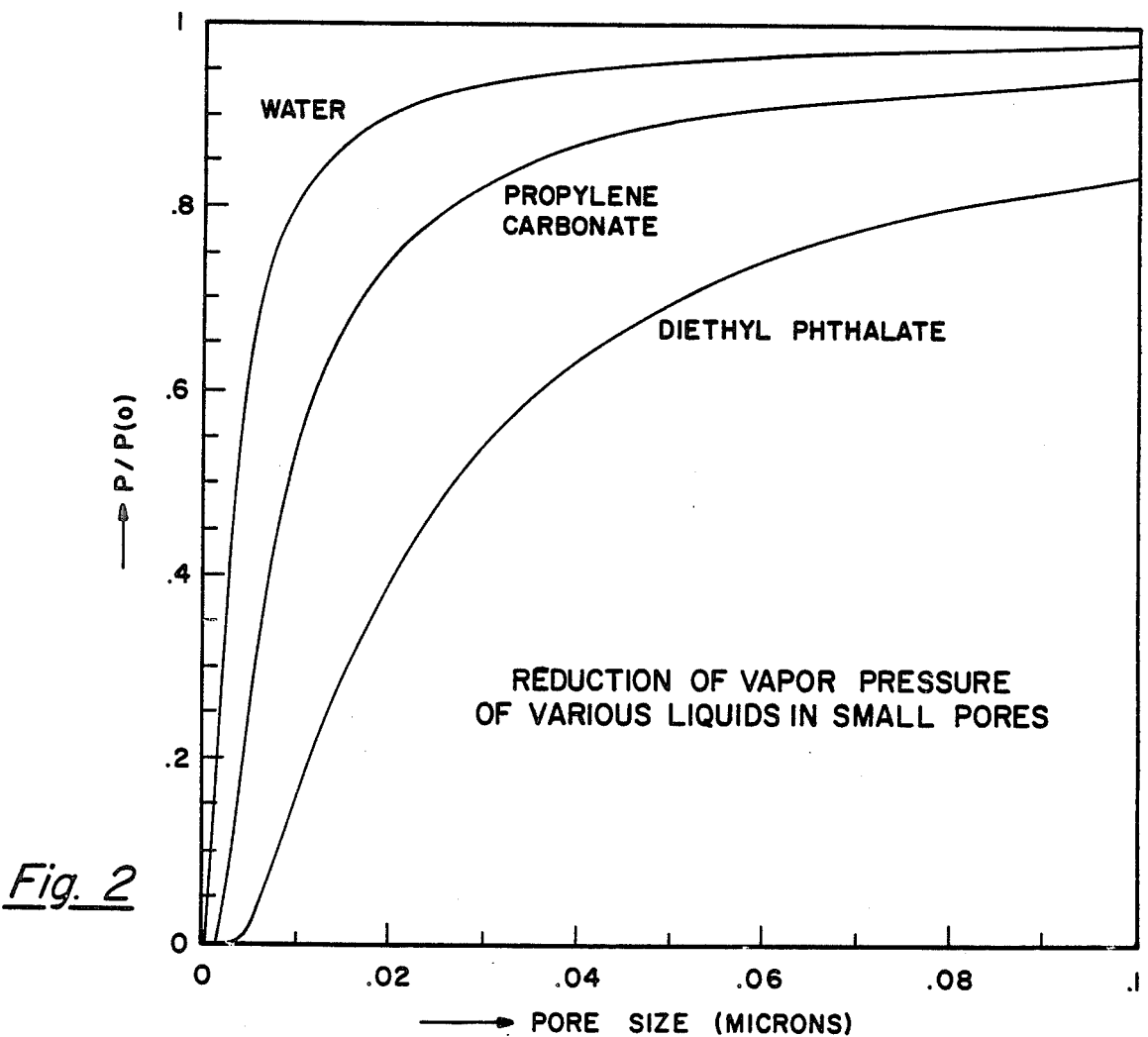
FIG. 2 illustrates the enhanced normalized vapor pressure reduction of liquids and solutions entrapped in very small pores in accordance with the invention.

FIG. 2 demonstrates the reduction of vapor pressure as calculated from the Kelvin equation for various liquids in small pores. The Kelvin effect for capillaries was not verified until 1979 but has since been experimentally measured down to 40 angstroms. See, for example, L. R. Fisher and Isrealachvili, J. N. *Nature*, 1979, 277, 548.

For the common case in which a liquid is exposed to an inert gas such as air and in which the vapor pressure of the liquid is much less than the absolute pressure of the gas the Kelvin effect has been explained as by A. W. Adamson, *Physical Chemistry of Surfaces*, Wiley-Interscience, New York, 1982. The reduction in the vapor pressure of the liquid is due to the decreased absolute pressure P of the liquid in the pores. This reduction is the result of the concave surface which is formed at the gas-liquid interface. If a liquid wets the walls of the pore, the liquid surface is thereby constrained to lie parallel (or close to parallel if the contact angle is nonzero) to the wall, and the complete surface must therefore be concave in shape (FIG. 1). Because the interface is curved, the surface tension causes the absolute pressure on the liquid side to be reduced. The pressure different $\Delta P$ across this interface is given by the Young and Laplace equation, which for a hemispherical surface is:

$$\Delta P = 2\gamma/r' \quad (2)$$

where $\Delta P$ or $dP$ is the decrease in the absolute pressure, $\gamma$ is the surface tension and $r'$ is the radius of curvature. The reduction in absolute pressure decreases the molar free energy G of the liquid and thereby reduces the vapor pressure. The molar free energy can be related to absolute pressure by $$G = VdP \quad (3)$$

where V is the molar volume, which in this case is considered to be constant. The vapor pressure of a liquid is a function of the molar free energy and it can be seen from the equation $$G = G^\circ + RT\ln P \quad (4)$$

that when G is lessened the vapor pressure is also reduced.

Although Lord Kelvin developed the equation describing the relationship between the vapor pressure of liquids immobilized in pores and pore diameter in the late eighteen hundreds, it was not verified until 1979 (L. R. Fisher, et al, supra). Fisher et al verified the Kelvin equation only for pure liquids. It is not clear what effect small capillaries would have on the vapor pressure of solutions, although, some literature suggests that the vapor pressure suppression effect should be enhanced with the presence of solutes. Such was suggested by M. Folman and J. L. Shereshefsky in *Jour. of Phys. Chem.*, 1955, 59, 607.

An example of the applicability of the Kelvin principle will now be presented and the effect of pore size on the stability of aqueous membranes, discussed.

SPECIAL STABILITY PROBLEMS OF AQUEOUS MEMBRANES

Aqueous-based ILMs are one of the most important and most studied types of ILMs. It has been found that aqueous solution membranes with high concentrations of electrolytes are especially useful because they are one of the best barriers to nitrogen and oxygen. This is important for separations in ambient conditions when it is desirable to remove or collect trace gases or vapors while not collecting either oxygen or nitrogen. Also, aqueous membranes support many highly-selective carrier molecules making facilitated transport easier.

The problem with aqueous ILMs, as discussed above, has been that they are inherently unstable. The stability problems of aqueous ILMs are due to (1) the high vapor pressure of water, and, (2) the varying background partial pressures of water vapor present in ambient atmospheres. The high vapor pressure of water results in rapid evaporation of the aqueous membrane during exposure to dry environments. Conversely, when the relative humidity is high, an aqueous membrane containing a salt solution with a high ionic strength will often "flood", i.e., the salt solution in the membrane will absorb water until it overfills the porous support and runs down the membrane surface. Because of the conflicting problems of evaporation and flooding, such aqueous membranes are stable only over a narrow humidity range. An aqueous/$Cs_2CO_3$ ILM developed for $CO_2$ separation by Ward required an environment limited to 70-85% R.H. for effective use. This is discussed in W. J. Ward, Report No. AMRL-TR-67-53, Aerospace Medical Research Laboratories, Wright-Patterson Air Force Base, 1967.

In order to make aqueous ILMs practical, a method of eliminating the evaporation problem has been needed. This can be done by reducing the vapor pressure of water in the membrane below the lowest partial pressure of water vapor in the feed gas. In ambient environments in which the relative humidity ranges from 10-90%, this means the vapor pressure of the water in the membrane should be less than 2 mm.Hg. Thus, a method of reducing the vapor pressure of the immobilized liquid is needed which does not increase the flooding problem.

Although increasing the concentration of solutes reduces the vapor pressures of aqueous solutions, it does not increase the usable humidity range since it magnifies the flooding problem. An aqueous solution which is saturated will also have only a narrow range of humidities, approximately 10-20%, in which it is stable. The mean value of the range is determined by the solute concentration.

It can be seen how the prior knowledge with respect to the Kelvin effect and its application to aqueous ILMs in particular has led to the evaporation/flooding dilemma which has severely limited the usefulness of such membranes. In accordance with the present invention, new discoveries regarding the Kelvin effect on aqueous solutions have led to the development of stable liquid membranes and methods of making them. Insofar as aqueous or water-based liquid membranes are concerned, successful stabilized liquid membranes have been found to depend on the complicated interrelationship among vapor pressure, pore size, solute concentration and ambient relative humidity.

In order to determine the relationship between pore size and vapor pressure, solutions were immobilized in porous structures and a method was devised to measure the resulting vapor pressure. These areas are presently addressed.

EXAMPLE 1

Polymeric membranes made of cellulose nitrate such as MF-series available from Millipore Corporation of Bedford, Mass., were used to immobilize the solutions. These membranes do not have the well defined pore configuration and size distribution of track-etched membranes but rather have a sponge-like pore structure and a known average pore size. These membranes were used for the tests because the polycarbonate track-etched membranes such as, for example, PC-series available from Nuclepore Corporation of Pleasanton, Calif., were not chemically compatible with the lithium bromide used as the solute in the solutions. Another reason for using cellulose nitrate as porous material is that the contact angle between it and water is very small, approximately 18 degrees, and thus the liquid wets the membrane quickly and the effective pore size is only 5% larger than the membrane pore size.

Figure 3:
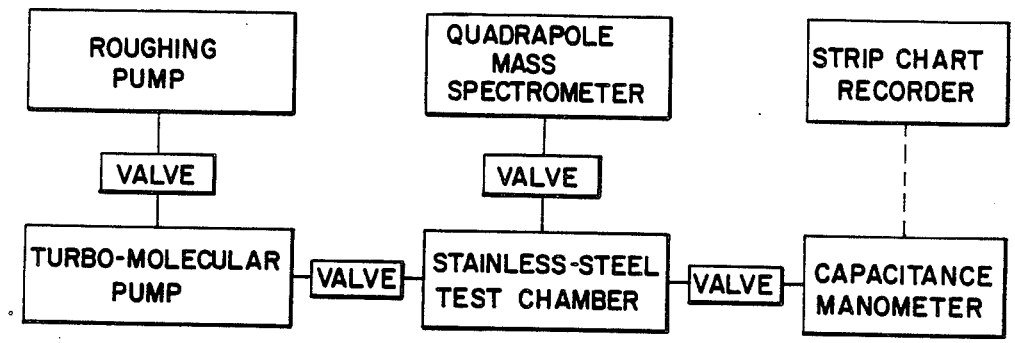
FIG. 3 is a schematic diagram of a vapor pressure test apparatus.

A literature review on vapor pressure measurement uncovered no "standard" test system which might be used for this application. FIG. 3 schematically shows the system designed and used for measuring vapor pressure.

The specific hardware used in the vapor pressure test equipment included an MKS 390 absolute pressure capacitance manometer (100 torr full scale) for pressure measurement, a Keithly thermocouple system for temperature measurement, an MKS 398 differential capacitance manometer (1 torr full scale) with molecular flow element for mass flow measurement, an Alcatel model 86 turbomolecular pump with an Alcatel roughing pump as backing for pumping, and a dual pen Honeywell strip chart recorder for data storage. The vacuum system components were made of stainless steel and VCR vacuum fittings with copper gaskets were used for connections.

The test procedure for vapor pressure determination was as follows:

1. The sample was placed in the test chamber. (The test chamber consisted of a 4 inch viewport with an o-ring seal. A flange with a tube with a VCR fitting served as the top to the chamber. The total volume of the chamber was very small, approximately 10 cc.).
2. The chamber was evacuated with vacuum pumps for five seconds. (This not only eliminated most of the ambient air but also removed the liquid vapor present, temporarily upsetting the gas-liquid equilibrium.).
3. The valve to pumps was closed and the absolute pressure in the test chamber allowed to equilibrate (After the test chamber was closed off the total pressure in the test chamber increased because liquid molecules went into the gas phase to re-establish equilibrium).
4. The resulting absolute pressure was measured with a capacitance manometer. The measurement was recorded after the pressure had stabilized. Also, the system temperature was recorded at this time since vapor pressure, of course, is a function of temperature.

Control experiments confirmed the accuracy of the vapor measurement technique. Bulk solutions were placed in small glass containers and the vapor pressure measured. For example, the vapor pressure of distilled water was determined to be 23.0 mmHg at 24±1° C., which agrees well with the value of 22.3 mmHg at 24 degrees obtained from the Chemical Rubber Company *Handbook of Chemistry and Physics*. The vapor pressure of a saturated NaBr solution was measured to be 12.4 mmHg at 22±1° C., in good agreement with the value of 13.4 mmHg at 25° C. reported by J. N. Pearce, et al, *J. of Phy. Chemistry*, 1928, 50, 2951.

Next, controls were done to characterize the LiBr solution in bulk form. The vapor pressure of saturated LiBr solution was measured and found to be 1.4 mmHg at 21±1 degrees Celcius. This value is consistent with previous experimental results of 1.8 mmHg at 25° C. reported by D. A. Boryta, et al, *J. of Chem. and Eng. Data*, 1975, 20, No. 3.

The sample was then successively pumped on to remove water, and, as shown in FIG. 4, two more pressure plateaus became evident. At the transition between the original and second plateaus, the solution changed from being transparent to translucent. This appears consistent with a change from the clear saturated solution to the white crystalline dihydrate. Also, a one-to-one relationship between the number of moles of water that could be removed after the onset of the third plateau, and the number of moles of LiBr present in the system, was measured with a molecular flow element. No further plateaus were found down to 0.01 mmHg. These observations clearly suggest that the second and third plateaus in FIG. 4 represent the vapor pressures of the di- and mono-hydrated LiBr crystals which were determined to be 0.85 mmHg and 0.6 mmHg at 21° C., respectively.

The vapor pressure of pure water in a porous membrane (0.2$\mu$ pore diameter) was found to be the same as bulk water. This is consistent with the Kelvin equation, which predicts only one percent reduction in vapor pressure. Next, the vapor pressures of saturated LiBr solutions in porous membranes of various pore diameters were measured. The results obtained from these measurements are shown in FIG. 5. These results are consistent with those for other solutes shown in FIG. 2.

Along with vapor pressure, condensation rate is also an important parameter in membrane stability. The condensation rate is a measure of the ability of the liquid membrane to replenish its liquid content and is especially important when the membrane is used with backside pumping. Condensation rates were measured as a function of pore size for the aqueous LiBr liquid membrane. FIG. 6 illustrates graphically the dependence of condensation rate on pore size.

The results of Example 1 show that the vapor pressure of an aqueous solution can be greatly reduced whenw it is immobilized in very small pores. In fact, as FIG. 2 illustrates, the extent of the vapor pressure reduction is approximately one order of magnitude greater than predicted by the Kelvin equation.

The Kelvin equation was derived and verified using uniform capilaries, when the following values were used in the calculations: $y = 71$ dyn/cm, $= 1.0$ gm/ml, $M = 18$ g/mole, contact angle $= 18$ degrees, and $r$ was the nominal pore radius given by the manufacturer. This was compared with observed results. For example, the Kelvin equation predicted a 7% decrease in vapor pressure for the aqueous lithium bromide solution in a 0.025 diameter pore, yet a 54% decrease was observed. Similarly, a 2% decrease in vapor pressure for the 0.1 pore diameter is predicted while a 29% reduction was measured. It can, thus, readily be seen that the use of very small pores, nominally 0.1 micron or less, significantly increases the stability of ILMs to a far greater extent than predicted. The ramifications in accordance with the invention are noteworthy with respect to the entire technology surrounding the practical application of ILMs to separation science.

EXAMPLE 2

An aqueous LiBr membrane was fabricated by soaking a porous 47 mm diameter cellulose acetate/nitrate membrane in a 3M LiBr solution for 24 hours. The membrane was then exposed to a vacuum for five hours to remove the water while leaving the lithium bromide. It was then placed into the apparatus shown in FIG. 7 and exposed to a nitrogen mixture containing approximately 10 mmHg water vapor until the pores filled via condensation.

For stability testing, the boundaries of the humidity range in which the aqueous membrane is stable were determined on the low end by liquid phase evaporation and at the high end by liquid flooding. The evaporation of the liquid phase was determined by (1) a visual change in the membrane from translucent to opaque and (2) a radical change in total membrane flux and selectivity. The aqueous LiBr membrane was exposed to a nitrogen stream mixed with varying amounts of water vapor. The membrane evaporation point was determined by the above methods to be 4±1% R.H. at 25° C.

The point at which flooding occurs was measured optically by having a light source on the membrane and observing the reflectance change. The membrane, which normally is non-reflective due to the very irregular surface structure of the porous matrix, becomes very reflective at the onset of flooding. The onset of flooding, which is strongly a function of pore size, was measured at 90% R.H. for an aqueous/LiBr membrane utilizing a cellulose acetate/nitrate matrix with 0.05 micron pore diameters.

When the aqueous/LiBr membrane is exposed to a gas with less than the equivalent of 3% R.H. humidity the aqueous phase evaporates. It is interesting to note that upon re-exposure to higher humidities, water vapor condenses and refills the pores to the original levels. This property of self-regeneration is demonstrated in FIG. 8. The membrane was placed in the apparatus shown in FIG. 7 and the pressure on the vacuum side was measured. The measured pressure is a function of the total flux through the membrane. During exposure to dry nitrogen (FIG. 8) the aqueous phase of the membrane evaporated, allowing the free convection of nitrogen through the porous matrix. Upon exposure to a more humid mixture, water vapor condensated in the pores and refilled the membrane, thus, resulting in a decreased measured pressure.

The method and technique used for fabrication of the aqueous liquid membranes also appears important in achieving good stability. Membranes filled by condensation methods appear more stable than those which are soaked and allowed to dry. One possible reason for this may be that the condensation method avoids the problem of overfilling and thus ensures good curvature of the pore openings.

When using hygroscopic liquids, the membranes should be underfilled to allow for changes in liquid volume. Although the use of matrices with small pores reduces the uptake of water with changes in humidity, an excess of capacity in the matrix can further extend the usable humidity range. This concept of a variable-volume liquid membrane is useful when using hygroscopic liquids such as polyethylene glycol and high ionic strength aqueous solutions.

Of course, the choice of the polymer support for the liquid membrane matrix, as well as for the membrane itself, is a function of not only pore size but also of chemical compatibility. See, J. D. Way, R. D. Noble, B. R. Bateman, In *Materials Science of Synthetic Membranes;* D. R. Lloyd, Ed.; ACS Symposium Series No 269; American Chemical Society: Washington, D.C., 1985; pp 119-128. For an ILM with a long lifetime, a matrix material which is inert to the liquid phase is required. The cellulose acetate/nitrate supports used in the experiments, lost their initial structural strength over time and these are not recommended for this application. Polysulfone porous supports, for example, have much greater resistance to aqueous electrolytes.

Another problem associated with support selection is lack of homogeneity of pore size. If the membrane supports initially used have larger pores in the mid-section of the support than on the surface due to the casting methods used they may be undesirable. If only the large pores of the middle are filled, a vapor pressure reduction much less than predicted is observed.

It should also be noted that although only aqueous membranes with LiBr have been discussed in the preceding sections, the concept of stabilizing liquid membranes of the invention applies to other systems as well. If the basic criteria are followed, many possible combinations exist in aqueous solutions, non-aqueous liquids, especially those with molecular weights above 100 with high surface tensions, can also be stabilized in a similar fashion.

In addition to stability, flux is an important ILM consideration. The flux across a membrane determines the amount of membrane surface area needed for a given application. The higher the flux, the lower the amount of surface area of membrane required.

Of course, the flux may be increased by the use of facilitated transport as illustrated in FIG. 10. In that technique, the transport of a species of interest across the membrane is augmented by a reversible reaction with a carrier species which, in effect, shuttles the desired compound of interest or permeant species across the membrane in the pores. The mechanism is based on a specific chemical reaction which enables the membrane to be very selective. Selection of the carrier species molecule, of course, depends on the permeant or species of interest sought to be preferentially transported. Specific examples of this technique applied with limited success to prior membranes are described by W. J. Ward, III in *Recent Developments In Separation Science,* Vol. 1, CRC Press, 1972 (pp. 153-161). The solute/solvent combinations selected for the ILMs of the present invention, of course, can be made keeping in mind the possibility of using facilitated transport for the species of interest depending on the application.

The thickness of ILMs is determined by the thickness of the porous matrix used. Although some fall outside the range, common matrices are symmetrical porous polymers with thicknesses of 10 to 200 microns as shown in simplified schematic form in FIG. 11. The selection of the matrix thickness is to some extent a trade off between desired flux and structural strength. A thin matrix results in an ILM with high flux and little structural strength, while a thick matrix results in an ILM with reduced flux and good structural strength. For most applications, the 10-200 micron membranes are satisfactory. For some industrial applications, however, even the thinnest conventional ILMs ($\sim$10 microns) have too low a flux for efficient operation. Since flux is inversely proportional to membrane thickness, and since membrane area is the dominating factor in system capital costs, the importance of reducing membrane thickness for such applications is evident.

According to a further aspect of the present invention, a very thin membrane with good mechanical strength has been developed by integrating a structure with distinct selective and supporting elements. An example of this is a thin selective layer supported by a thick porous layer. Since the functionality of the two elements are separated, the flux and mechanical strength can be manipulated independently to meet the application requirements.

Composites per se have been made with solid polymer membranes as disclosed by Loeb et al, supra, which discusses polymer/dopant recipes and casting/coagulation procedures which made possible the formation of asymmetric membranes comprised of a very thin (0.1-1.0 $\mu$m) "skin" layer resting atop a much thicker (~100 μm) microporous substrate region. For gas phase operation, the film is annealed to produce a dense pore-free skin. Another type of ultra-thin polymer membrane, the supported ultra-thin membrane disclosed by Riley, et al, supra, involves the creation of a two layer laminate in which the thin and selective film is supported by a microporous backing. The backing is made sufficiently porous so as to minimize its flow resistance, while its pores are made sufficiently small that the burst strength of the thin membrane is not exceeded where it spans the mouth of a pore.

ILMs can be fabricated according to the invention which any porous matrix in which the liquid phase wets the matrix material and the pores are sufficiently small. Since commercially available asymmetric membranes with thin (0.1-1.5 micron) porous skins supported by a macroporous backing exist, it is possible to fabricate liquid membrane versions of the supported ultra-thin polymer membranes as shown in FIG. 12. Examples of such structures includes ultra-thin (0.1-1.5 micron) membrane skins cast onto open porous substrates of like material of a much thicker (50-250 micron) open-celled spongy form. The pores of the skin are extremely fine and controlled to less than 0.1 micron (even to less than 0.01 micron). Materials include polysulfone, regenerated cellulose, acrylic copolymers and others. A relatively thin, strong backing layer of non-woven polyethylene such as Tyvex (trademark of E. I. DuPont) may also be used to further strengthen the structure by thermal bonding to the spongy layer.

A major obstacle to fabricating ultra-thin membranes with asymmetric supports is finding a method to selectively immobilize the liquid phase in the microporous skin while leaving the macroporous support free of liquid. If the support area is also wetted the membrane will behave essentially as a conventional ILM.

According to the present invention, several methods have been developed for selectively immobilizing the liquid phase in the skin rather than the support of the asymmetric membranes. The methods are presently discussed.

SELECTIVE CONDENSATION OF LIQUID PHASE INTO SKIN

The liquid phase can be applied to the skin layer of the porous membrane by exposure to a gas saturated with the desired liquid vapor. If the pores are small enough, the liquid will condense and fill the small pores in the skin. Condensation occurs selectively because of the reduced chemical potential of liquids in small pores. The process can be monitored and controlled by using the apparatus of FIG. 7. The membrane is placed in a membrane holder with the skin layer exposed to the feed gas and the support exposed to the vacuum. Initially the skin is exposed to dry nitrogen in order to remove any adsorbed vapors and the valves to the vacuum pump are opened. After a baseline pressure is achieved, the skin is slowly exposed to nitrogen saturated with the desired liquid vapor. In some cases, it is advantageous to heat the gas in order to increase the vapor concentration, although too much heating results in bulk condensation on the membrane surface. When all of the pores in the surface layer are filled with liquid, the pressure on the vacuum side will sharply decrease and stabilize. The magnitude of the pressure decreases depending on the porosity of the skin, the composition of the liquid phase and the carrier gas used. This method works well with homogeneous liquids, but is not suitable for heterogeneous solutions.

DIRECT APPLICATION OF LIQUID TO SKIN

Another method of establishing the liquid phase is to apply the liquid directly to the skin. This can be done in two ways. The first is to carefully use a paint brush, or other device, to apply a limited amount of liquid to the surface of the skin layer. The progress can be monitored by utilizing a system similar to the one in FIG. 7 fitted with a membrane holder with an open feed side. The pressure drop again can be used as an indicator of liquid coverage. The disadvantage of this method is poor control over membrane thickness and also variability of the membranes.

The second method is to float the ultra-high porous membrane, skin side down, on the surface of the desired liquid for a given period of time. This method works well with heterogeneous solutions such as water with dissolved solids, but its use it limited to liquids with a high surface tension. The surface tension keeps the membrane afloat so that only the skin pores are exposed to the liquid.

BULK APPLICATION OF LIQUID AND SELECTIVE REMOVAL FROM SUPPORT

The third method is unlike the other two, in that, the entire matrix (skin and support) are immersed in the desired liquid, and the liquid in the supporting matrix is selectively removed. After the matrix is soaked in solution, the support side is exposed to a vacuum. The liquid in the supporting matrix is selectively removed due to the higher vapor pressure, and therefore evaporation rate of the liquid in the large pores of the support relative to the small pores of the skin.

The optimum method to be used is determined by the nature of the liquid phase to be immobilized. In some cases it is desirable to use a combination of the techniques.

EXAMPLE 3

An ultra-thin version of the aqueous/LiBr membrane of Example 1 was fabricated by floating a 47 mm diameter asymmetric cellulose acetate membrane (Amicon—Trademark of Amicon Division, W. R. Grace & Company of Danvers, Mass.) on a 6.9M LiBr solution for 24 hours. The membrane was then exposed to a vacuum for five hours to remove the water while leaving the lithium bromide. It was then exposed to a nitrogen/oxygen mixture containing approximately 10 mmHg water vapor until the pores filled.

The existence of the liquid layer in the ultra-thin aqueous/LiBr membrane was verified by a three fold drop in pressure on the vacuum side and a change in the oxygen/nitrogen ratio measured with an attached quadrapole mass spectrometer. The membrane matrix was weighed before and after the treatment in order to determine a mean membrane thickness. The weight gain of the membrane was 3 mg which would translate into an average aqueous layer thickness of two microns.

The membrane remained stable over 35 days of testing in which a vacuum was pulled on the support side while the skin side was exposed to ambient conditions. Both the pressure drop and the oxygen/nitrogen ratio were measured over this period.

The membrane also exhibited the same self-repair properties as the thicker (100μ) aqueous LiBr membrane (see FIG. 8). After having the water removed from the matrix by extended exposure to dry nitrogen (>0.01% R.H.), the liquid phase was regenerated upon exposure to ambient conditions.

The evaporation of the liquid phase, the limiting factor in ILM lifetime, has been reduced by decreasing the liquid's radius of curvature at the gas/liquid interface. This is accomplished by selecting a support with very small pore diameters. In order to maximize the effect of the small pores, it is advantageous to apply the liquid in vapor form and allow the pores to fill by condensation. When hygroscopic liquids are used, the selection of pore size is again important to maximize flooding problems. Designing the membrane for variable volume operation also helps to reduce this problem.

Ultra-thin liquid membranes can be formed in the upper layer of a porous asymmetric polymer membrane by methods in which the liquid is selectively deposited in the skin rather than the backing support. The wide variety of pore sizes and membrane configurations available in asymmetric membranes allows for good flexibility in the design of ultra-thin liquid membrane systems.

The large differences in the gas/vapor solubilities of various liquid phases allow for the development of highly selective membranes. It is possible to fabricate stable ILMs composed of homogeneous liquids with selectivity ratios greater than 100,000 to 1. To further enhance performance, facilitator molecules can be added to many liquid membranes. In the case of the ultra-thin liquid membranes, the choices of facilitators is limited to those with very rapid reaction times since the diffusion time across the membrane is very short.

Because of their high gas diffusion coefficients (1000× greater than in solids) and the solubilities, liquid membranes are inherently permeable. Homogeneous liquid membranes with permeabilities approaching those of microporous membranes (100,000 Barrer) are possible. The fabrication of ILMs in ultra-thin form enhances the already high flux, such that, in some cases the boundary layer of gas passing over the membrane acts as a greater barrier than the membrane itself. In this case the design of a system in which the boundary layer thickness is minimized becomes the paramount concern.

It should also be noted that when solids are cast very thin, pin hole problems frequently occur. The occurrence of pin holes results in the convective transfer of gases across the membrane and thus a reduction in selectivity. Pin hole densities as low as $10^{-6}\%$ are enough to prevent a membrane from effectively separating gases. D. A. Boryta, et al, *J. of Chem. and Eng. Data*, 1975, 20, No. 3. Because of the nature of liquids, this is not a problem in ILMs.

Without further elaboration, it is believed that one skilled in the art can, using the preceding description, utilize the present invention to its fullest extent. The preferred or specific embodiments are, therefore, to be construed as merely illustrative, and not limitative of the remainder of the disclosure in any way whatsoever.

What is claimed is:

1. A stabilized immobilized liquid membrane (ILM) for transporting at least one gaseous species of interest comprising:
   a composite membrane structure further comprising an ultra-thin membrane skin having microscopic pores therein characterizing an anisotropic microporous film and a relatively thick macroporous support substrate carrying said utra-thin membrane skin; and
   a quantity of liquid transport medium contained in the pores of said ultra-thin membrane skin.

2. The stabilized ILM of claim 1 wherein liquid transport medium consists substantially of dimethyl silicon oil and said composite membrane consists substantially of polysulfone.

3. A stabilized ILM for enhancing the transport of at least one gaseous species of interest comprising:
   a composite polymeric membrane structure further comprising an ultra-thin membrane skin having microscopic pores therein characterizing an antistropic microporous film and a relatively thick macroporous polymeric support substrate membrane carrying said ultra-thin membrane skin;
   a quantity of liquid transport medium contained in the pores of said ultra-thin membrane skin wherein said liquid transport medium is one which wets the surface of the microscopic pores; and
   wherein the microscopic pores of said membrane skin are of an average size sufficiently small such that the vapor pressure of the liquid transport medium contained therein is reduced by an amount at least as great as that theoretically predicted by the Kelvin effect.

4. The stabilized ILM of claim 3 wherein the ultra-thin polymeric membrane skin of the composite polymeric consists substantially of a polymer selected from a regenerated cellulose, acrylic copolymer and polysulfone.

5. The stabilized ILM of claim 4 wherein said polymer support substrate is of the same polymer as the skin.

6. The stabilized ILM of claim 3 wherein said liquid transport medium consists substantially of water.

7. The stabilized ILM of claim 3 wherein said average pore size of said skin is $\leq 0.1$ micron and the thickness of said skin is $\leq 1.5$ microns.

8. The stabilized ILM of claim 7 wherein said support substrate membrane has a thickness of from 50 to 250 microns.

9. The stabilized ILM of claim 7 wherein said average pore size is $<0.02$ micron.

10. A stabilized ILM for the permaselective transport of at least one gaseous species of interest in a gaseous mixture comprising:
    a composite polymeric membrane structure further comprising an ultra-thin polymeric membrane skin having microscopic pores therein forming an anisotropic microporous film and a relatively thick macroporous polymeric support substrate membrane carrying said ultra-thin membrane skin;
    a quantity of liquid transport medium contained in the pores of said ultra-thin membrane skin wherein said liquid transport medium is one which wets the surface of the microscopic pores and is further characterized substantially as a solution containing a combination of solvent and solute; and
    wherein the microscopic pores of said membrane skin are of an average size sufficiently small such that the vapor pressure of the liquid transport medium contained therein is reduced by an amount greater than that theoretically predicted by the Kelvin effect.

11. The stabilized ILM of claim 10 wherein the ultra-thin polymeric membrane skin of the composite polymeric consists substantially of a polymer selected from a regenerated cellulose, acrylic copolymer and polysulfone.

12. The stabilized ILM of claim 11 wherein said polymer support substrate is of the same polymer as the skin.

13. The stabilized ILM of claim 12 wherein the liquid transport medium is further characterized substantially as an aqueous solution.

14. The stabilized ILM of claim 11 wherein the liquid transport medium is further characterized substantially as an aqueous solution.

15. The stabilized ILM of claim 14 wherein said solute is an hygroscopic ionic salt.

16. The stabilized ILM of claim 15 wherein said salt is an alkali metal salt.

17. The stabilized ILM of claim 10 wherein the liquid transport medium is further characterized substantially as an aqueous solution.

18. The stabilized ILM of claim 17 wherein said solvent is non-aqueous.

19. The stabilized ILM of claim 17 wherein said solute is an hygroscopic ionic salt.

20. The stabilized ILM of claim 19 wherein said salt is an alkali metal salt.

21. The stabilized ILM of claim 10 wherein said solvent is non-aqueous.

22. A method of stabilizing an immobilized liquid membrane (ILM) for transporting at least one gaseous species of interest wherein said membrane comprises a composite structure having an ultra-thin membrane skin with microscopic pores therein characterizing an anisotropic microporous film and a relatively thick macroporous support substrate carrying said ultra-thin membrane skin, said method comprising:

the step of introducing a quantity of liquid transport medium into the pores of said ultra-thin membrane skin by exposure to a gas saturated with the vapor of the desired liquid.

* * * * *